United States Patent
Di et al.

(10) Patent No.: US 12,532,710 B2
(45) Date of Patent: Jan. 20, 2026

(54) MEASUREMENTS OF SEMICONDUCTOR STRUCTURES BASED ON SPECTRAL DIFFERENCES AT DIFFERENT PROCESS STEPS

(71) Applicant: KLA Corporation, Milpitas, CA (US)

(72) Inventors: Ming Di, Milpitas, CA (US); Qiang Zhao, Milpitas, CA (US); Tianhao Zhang, Shanghai (CN); Dawei Hu, Shanghai (CN); Yih Chang, Shanghai (CN); Xi Chen, Shanghai (CN)

(73) Assignee: KLA Coporation, Milpitas, CA (US)

( * ) Notice: Subject to any disclaimer, the term of this patent is extended or adjusted under 35 U.S.C. 154(b) by 414 days.

(21) Appl. No.: 18/210,571

(22) Filed: Jun. 15, 2023

(65) Prior Publication Data

US 2024/0186191 A1   Jun. 6, 2024

Related U.S. Application Data

(60) Provisional application No. 63/429,553, filed on Dec. 2, 2022.

(51) Int. Cl.
  *H01L 21/66*  (2006.01)
  *G01J 3/02*  (2006.01)
  *G01J 3/28*  (2006.01)

(52) U.S. Cl.
  CPC ............ *H01L 22/12* (2013.01); *G01J 3/0229* (2013.01); *G01J 3/2823* (2013.01)

(58) Field of Classification Search
  CPC ........ H01L 22/12; G01J 3/0229; G01J 3/2823
  See application file for complete search history.

(56) References Cited

U.S. PATENT DOCUMENTS

| | | |
|---|---|---|
| 5,608,526 A | 3/1997 | Piwonka-Corle et al. |
| 5,859,424 A | 1/1999 | Norton et al. |

(Continued)

FOREIGN PATENT DOCUMENTS

EP    3298460 B1    3/2019

OTHER PUBLICATIONS

International Search Report mailed on Mar. 20, 2024, for PCT Application No. PCT/US2023/081706 filed on Nov. 30, 2023 by KLA Corporation, 3 pages.

(Continued)

*Primary Examiner* — Dominic J Bologna
(74) *Attorney, Agent, or Firm* — Spano Law Group

(57) ABSTRACT

Methods and systems for measuring values of one or more parameters of interest, including changes in values of one or more parameters of interest, based on measured spectral differences are presented herein. A trained spectral difference based measurement model determines changes in the values of one or more parameters of interest based on a measure of differences in spectra measured before and after one or more process steps. In some examples, a measure of spectral difference is determined based on a difference in measured intensity, a difference in harmonic signal values, or a difference in value of one or more Mueller Matrix elements. A measure of spectral difference may be expressed as a set of difference values, a scalar value, or coefficients of a functional fit to difference values. A measure of spectral difference may be determined based on a weighting of spectral differences according to wavelength.

20 Claims, 6 Drawing Sheets

(56) References Cited

U.S. PATENT DOCUMENTS

| | | | |
|---|---|---|---|
| 6,023,338 A | 2/2000 | Bareket | |
| 6,429,943 B1 | 8/2002 | Opsal et al. | |
| 6,716,646 B1 | 4/2004 | Wright et al. | |
| 6,778,275 B2 | 8/2004 | Bowes | |
| 6,787,773 B1 | 9/2004 | Lee | |
| 6,992,764 B1 | 1/2006 | Yang et al. | |
| 7,242,477 B2 | 7/2007 | Mieher et al. | |
| 7,321,426 B1 | 1/2008 | Poslavsky et al. | |
| 7,406,153 B2 | 7/2008 | Berman | |
| 7,478,019 B2 | 1/2009 | Zangooie et al. | |
| 7,626,702 B2 | 12/2009 | Ausschnitt et al. | |
| 7,656,528 B2 | 2/2010 | Abdulhalim et al. | |
| 7,826,071 B2 | 11/2010 | Shchegrov et al. | |
| 7,842,933 B2 | 11/2010 | Shur et al. | |
| 7,873,585 B2 | 1/2011 | Izikson | |
| 7,929,667 B1 | 4/2011 | Zhuang et al. | |
| 7,933,026 B2 | 4/2011 | Opsal et al. | |
| 8,068,662 B2 | 11/2011 | Zhang et al. | |
| 8,138,498 B2 | 3/2012 | Ghinovker | |
| 8,860,937 B1 | 10/2014 | Dziura et al. | |
| 9,291,554 B2 | 3/2016 | Kuznetsov et al. | |
| 9,826,614 B1 | 11/2017 | Bakeman et al. | |
| 9,885,962 B2 | 2/2018 | Veldman et al. | |
| 9,915,522 B1 | 3/2018 | Jiang et al. | |
| 10,013,518 B2 | 7/2018 | Bakeman et al. | |
| 10,101,670 B2 | 10/2018 | Pandev et al. | |
| 10,152,678 B2 | 12/2018 | Pandev et al. | |
| 10,324,050 B2 | 6/2019 | Hench et al. | |
| 10,352,695 B2 | 7/2019 | Dziura et al. | |
| 10,545,104 B2 | 1/2020 | Hench et al. | |
| 10,690,602 B2 | 6/2020 | Sapiens et al. | |
| 10,775,323 B2 | 9/2020 | Gellineau et al. | |
| 10,801,953 B2 | 10/2020 | Wang et al. | |
| 2003/0021465 A1 | 1/2003 | Adel et al. | |
| 2007/0176128 A1 | 8/2007 | Van Bilsen et al. | |
| 2007/0221842 A1 | 9/2007 | Morokuma et al. | |
| 2009/0152463 A1 | 6/2009 | Toyoda et al. | |
| 2011/0266440 A1 | 11/2011 | Boughorbel et al. | |
| 2012/0292502 A1 | 11/2012 | Langer et al. | |
| 2013/0114085 A1 | 5/2013 | Wang et al. | |
| 2013/0208279 A1 | 8/2013 | Smith | |
| 2013/0304424 A1 | 11/2013 | Bakeman et al. | |
| 2014/0019097 A1 | 1/2014 | Bakeman et al. | |
| 2014/0064445 A1 | 3/2014 | Adler | |
| 2014/0111791 A1 | 4/2014 | Manassen et al. | |
| 2014/0172394 A1 | 6/2014 | Kuznetsov et al. | |
| 2014/0222380 A1 | 8/2014 | Kuznetsov et al. | |
| 2014/0297211 A1 | 10/2014 | Pandev et al. | |
| 2014/0340682 A1* | 11/2014 | Kwak | G01N 21/274 356/369 |
| 2015/0046121 A1* | 2/2015 | Dziura | G01N 21/956 702/179 |
| 2015/0110249 A1 | 4/2015 | Bakeman et al. | |
| 2015/0117610 A1 | 4/2015 | Veldman et al. | |
| 2015/0176985 A1* | 6/2015 | Shchegrov | H01L 22/30 356/614 |
| 2015/0204664 A1 | 7/2015 | Bringoltz et al. | |
| 2015/0285749 A1 | 10/2015 | Moncton et al. | |
| 2015/0300965 A1 | 10/2015 | Sezginer et al. | |
| 2016/0061585 A1 | 3/2016 | Seo | |
| 2016/0202193 A1 | 7/2016 | Hench et al. | |
| 2016/0320319 A1 | 11/2016 | Hench et al. | |
| 2016/0341670 A1* | 11/2016 | Vagos | G01N 21/8851 |
| 2017/0167862 A1 | 6/2017 | Dziura et al. | |
| 2018/0061691 A1* | 3/2018 | Jain | H01L 22/12 |
| 2018/0100796 A1* | 4/2018 | Kwak | G01N 21/9501 |
| 2018/0106735 A1 | 4/2018 | Gellineau et al. | |
| 2018/0113084 A1 | 4/2018 | Hench et al. | |
| 2018/0328868 A1 | 11/2018 | Bykanov et al. | |
| 2019/0017946 A1 | 1/2019 | Wack et al. | |
| 2019/0178788 A1 | 6/2019 | Nguyen et al. | |
| 2019/0293578 A1 | 9/2019 | Gellineau | |
| 2020/0279783 A1 | 9/2020 | Timoney et al. | |
| 2021/0207956 A1 | 7/2021 | Shchegrov et al. | |

OTHER PUBLICATIONS

Lemaillet, Germer, Kline et al., "Intercomparison between optical and x-ray scatterometry measurements of FinFET structures" by Proc. SPIE, v.8681, p. 86810Q (2013).

Kline et al., "X-ray scattering critical dimensional metrology using a compact x-ray source for next generation semiconductor devices," J. Micro/Nanolith. MEMS MOEMS 16(1), 014001 (Jan.-Mar. 2017).

Gostein et al., "Measuring deep-trench structures with model-based IR," Solid State Technology, vol. 49, No. 3, pp. 38-42, Mar. 1, 2006.

* cited by examiner

MEASUREMENTS OF SEMICONDUCTOR STRUCTURES BASED ON SPECTRAL DIFFERENCES AT DIFFERENT PROCESS STEPS

CROSS REFERENCE TO RELATED APPLICATION

The present application for patent claims priority under 35 U.S.C. § 119 from U.S. provisional patent application Ser. No. 63/429,553, entitled "General Machine Learning Solution Based on Spectra Difference from Different Process Step Applied to Gate-all-around (GAA) Nanosheet, DRAM, 3D-Flash and 3D-DRAM Metrology," filed Dec. 2, 2022, the subject matter of which is incorporated herein by reference in its entirety.

TECHNICAL FIELD

The described embodiments relate to metrology systems and methods, and more particularly to methods and systems for improved measurement of parameters characterizing semiconductor structures.

BACKGROUND INFORMATION

Semiconductor devices such as logic and memory devices are typically fabricated by a sequence of processing steps applied to a specimen. The various features and multiple structural levels of the semiconductor devices are formed by these processing steps. For example, lithography among others is one semiconductor fabrication process that involves generating a pattern on a semiconductor wafer. Additional examples of semiconductor fabrication processes include, but are not limited to, chemical-mechanical polishing, etch, deposition, and ion implantation. Multiple semiconductor devices may be fabricated on a single semiconductor wafer and then separated into individual semiconductor devices.

Metrology processes are used at various steps during a semiconductor manufacturing process to detect defects on wafers to promote higher yield. Optical metrology techniques offer the potential for high throughput measurement without the risk of sample destruction. A number of optical metrology based techniques including scatterometry, reflectometry, and ellipsometry implementations and associated analysis algorithms are commonly used to characterize critical dimensions, film thicknesses, composition and other parameters of nanoscale structures.

A common approach to control a semiconductor fabrication process is to employ a metrology tool to perform measurements of structures fabricated on a wafer after one or more critical process steps in the fabrication process. In general, as critical steps are more densely sampled, process control is improved. However, process control in a high throughput manufacturing environment depends on having adequate measurement sensitivity and computationally efficient analytical procedures at any process step.

In general, the semiconductor industry strives to produce ever smaller devices with increasing structural complexity and material types. Exemplary devices that exhibit such complexity include Gate-All-Around (GAA) Field Effect Transistors (FET), current Dynamic Random Access Memory (DRAM) structures, and current three dimensional flash memory structures.

In one example, GAA FETs manufactured using nanosheet fabrication techniques enable improved device performance and low power consumption, but are difficult to manufacture due to their nanoscale size and complex shape. Nanosheet structures include several material layers. The process of fabricating a nanosheet structure starts by growing a superlattice of Silicon and Silicon Germanium layers. These layers comprise the base structure of a nanosheet. It is critical to measure the characteristics of each layer, e.g., film thickness, to maintain control of the manufacturing process.

Spectroscopic Ellipsometry (SE) is an established optical measurement technique employed to measure the physical and optical parameters of thin films. SE systems illuminate a structure under measurement with polarized light. The interaction between the illumination light and the structure under measurement changes the polarization of light reflected from the structure under measurement, and the change in polarization is sensitive to film thickness and material properties.

SE is an indirect method of measuring the physical properties of the specimen under measurement. In general, a physics-based measurement model is required to determine the physical properties of the specimen based on the raw measurement signals (e.g., $\alpha_{meas}$ and $\beta_{meas}$). Traditional SE measurements of nanosheet structures are complicated by measurement model complexity and measurement data correlation due to multiple, thin superlattice layers. Furthermore, SE measurements of nanoscale structures of next generation semiconductor structures, such as nanosheet structures, suffer from a lack of sensitivity.

For example, nanosheet structures include multiple, extremely thin layers, and it is important to measure changes in thickness and material properties of each layer in the multi-layer stack at various points in a semiconductor manufacturing process flow. For purposes of process monitoring, changes in multi-layer structures are calculated by comparing thicknesses and material properties before and after one or more process steps. For these differences to be meaningful, the thicknesses and material properties must be accurately measured both before and after the one or more process steps. Accurate measurements require signal sensitivity and complex, high dimensional models to try to break correlations between measurement system parameters and structural parameters. These models become too complex for practical solution.

Metrology applications involving nanoscale structures, such as nanosheet structures, present challenges due to practical limitations on measurement model complexity and signal sensitivity. Increasingly small resolution requirements, multi-parameter correlation, and increasingly complex geometric structures complicate this problem, and leave undesirable gaps in the control of advanced fabrication processes. Thus, methods and systems for improved process control of advanced fabrication processes are desired.

SUMMARY

Methods and systems for measuring values of one or more parameters of interest, including changes in values of one or more parameters of interest, due to one or more intervening process steps based on measured spectral differences are presented herein. A trained spectral difference based measurement model determines changes in the values of one or more parameters of interest based on differences in spectra measured before and after one or more process steps. In this manner, the structural changes induced by one or more process steps are measured based on changes in measured spectra, rather than changes in values of parameters of interest.

In some embodiments, a spectral difference module determines a measure of spectral difference by determining the difference in measured intensity at each of a discrete set of wavelengths.

In some embodiments, a spectral difference module determines a measure of spectral difference by determining the difference in measured values of harmonic signals at each of a discrete set of wavelengths.

In some embodiments, a spectral difference module determines a measure of spectral difference by determining the difference in measured values of one or more Mueller Matrix elements at each of a discrete set of wavelengths.

In some embodiments, a spectral difference module determines a measure of spectral difference by determining a scalar value indicative of the difference in measured values of spectral signals across all measured wavelengths.

In some embodiments, the measure of spectral difference is a set of coefficients characterizing a mathematical function fit to the spectral differences at each of a discrete set of wavelengths.

In some embodiments, the measure indicative of spectral difference is determined based on a weighting of spectral differences according to wavelength across a set of discrete wavelengths. In these embodiments, one or more spectral difference values are weighted differently than other spectral difference values across the set of discrete set of measured wavelengths. In this manner, the measure indicative of spectral difference, whether expressed as a set of difference values, a scalar value, or coefficients of a functional fit to difference values, is weighted based on wavelength.

The measures of spectral difference between adjacent measurement points in a fabrication process flow are communicated to a trained spectral difference based measurement module. The trained spectral difference based measurement model is employed to estimate values of one or more parameters of interest, including changes in values of one or more parameters of interest, due to the intervening process steps between adjacent measurement points based on the spectral differences.

In some embodiments, the trained spectral difference based measurement model is trained to receive a measure of spectral difference between two specific measurement steps and generate estimated values of one or more parameters of interest based on the spectral difference. In these embodiments, different trained spectral difference based measurement models are employed to estimate values of one or more parameters of interest based on measures of spectral differences associated with different pairs of measurement steps.

In some other embodiments, the trained spectral difference based measurement model is trained to receive multiple measures of spectral difference, each associated with a different pair of measurement steps, and estimate values of one or more parameters of interest based on each spectral difference. In these embodiments, a trained spectral difference based measurement model is employed to estimate values of one or more parameters of interest based on measures of spectral differences associated with different pairs of measurement steps.

In another aspect, a trained spectral difference based measurement model is employed to simulate changes in values of one or more parameters of interest, and the simulated changes are employed to adjust process control variables to improve process performance. In some embodiments, expected spectral difference data is simulated, e.g., using process and metrology simulators, or generated based on past use cases, user experience, etc. The expected spectral difference data is provided as input to a trained spectral difference based measurement model. The trained spectral difference based measurement model estimates expected values of one or more parameters of interest based on the expected spectral difference data. In this manner, the trained spectral difference based measurement model not only monitors the production of multilayer film stacks in-line, but also predicts production trends. In addition, one or more process variables, e.g., focus, dosage, etch time, etc., are adjusted based on the expected values of the parameters of interest. In this manner, the process is tuned to improve process performance.

In another aspect, a spectral difference based measurement model is trained based on Design Of Experiments (DOE) spectral signals associated with different measurement steps in a fabrication process flow. In some examples, a spectral difference based measurement model is trained based on simulated measurement data or actual measurement data associated with the measurement of Design of Experiments (DOE) wafers.

The foregoing is a summary and thus contains, by necessity, simplifications, generalizations and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Methods and systems for measuring values of one or more parameters of interest, including changes in values of one or more parameters of interest, due to one or more intervening process steps based on measured spectral differences are presented herein. A trained spectral difference based measurement model determines changes in the values of one or more parameters of interest based on differences in spectra measured before and after one or more process steps. In this manner, the structural changes induced by one or more process steps are measured based on changes in measured spectra, rather than changes in estimated values of parameters of interest.

In general, spectral signals measured at any particular process step are sensitive to exogenous factors such as the current environment, sample condition, etc., in addition to the underlying geometry and material characteristics of the measured structure. The dimension of a measurement model required to extract values of parameters of interest from spectral signals at any particular process step is relatively large because the model must account for the exogenous factors.

In contrast, spectral difference signals dramatically reduce sensitivity to exogenous factors and emphasize changes in measured structures due to intervening process steps. The spectral difference signals include information required to separate and measure changes in critical features with higher sensitivity than would otherwise be achievable based on the underlying measurement signals. Thus, a spectral difference based measurement model more accurately predicts changes in measured structures. Furthermore, the dimension of a measurement model operating on spectral difference signals is significantly reduced compared to a measurement model operating on spectral signals directly because the spectral difference signals are more sensitive to changes in measured structures due to intervening process steps. Hence, the dimension of measurement data required to train the spectral difference measurement model is also reduced compared to a traditional measurement model. In this manner, a spectral difference based measurement model improves computational efficiency and enables high throughput metrology suitable for in-line measurements within a high volume semiconductor manufacturing process flow.

Figure 1:
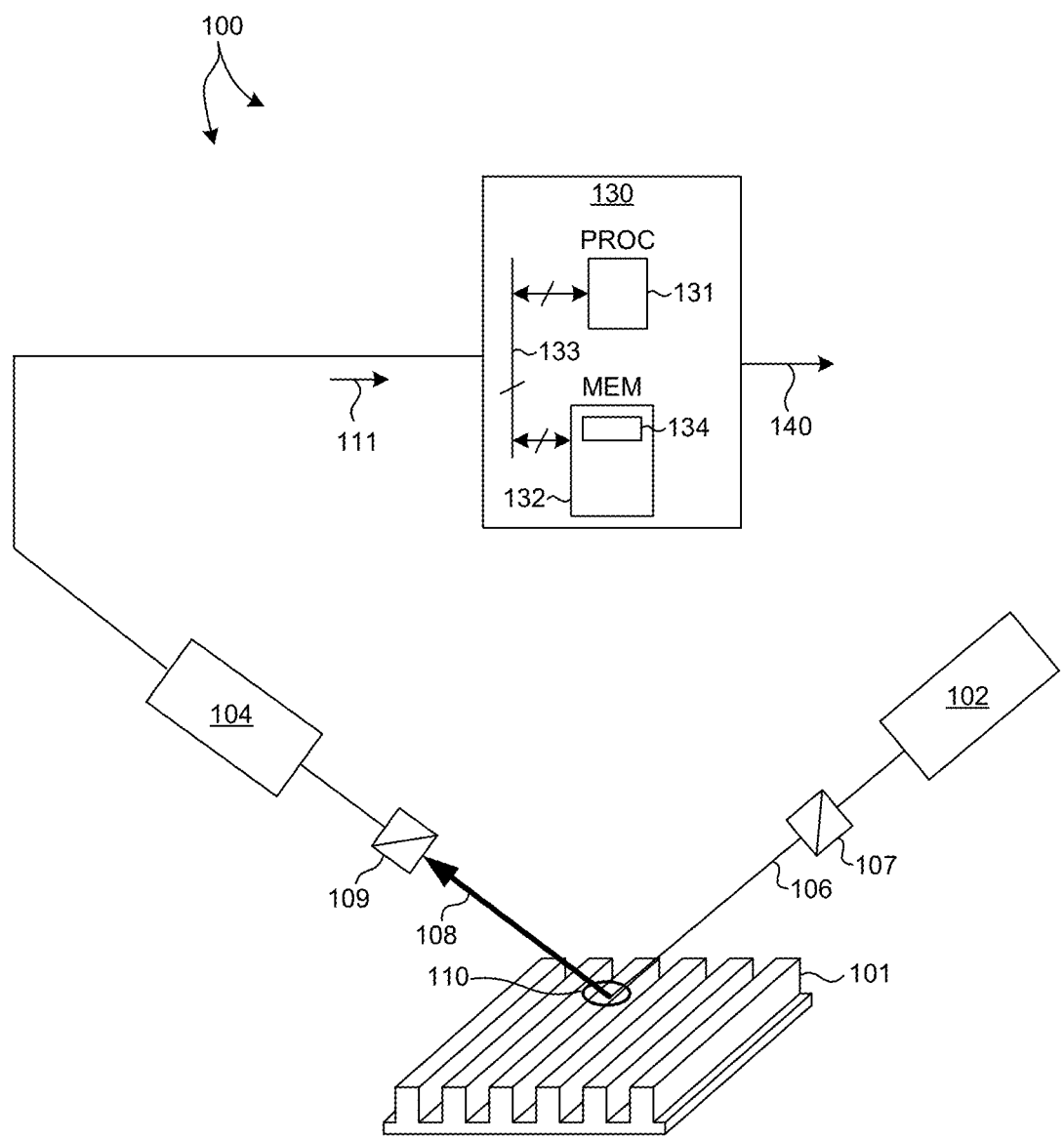
FIG. 1 is a diagram illustrative of a system 100 for measuring characteristics of a specimen in accordance with the exemplary methods presented herein.

FIG. 1 illustrates a system 100 for measuring characteristics of a specimen in accordance with the exemplary methods presented herein. As shown in FIG. 1, the system 100 may be used to perform spectroscopic ellipsometry measurements of one or more structures of a specimen 101. In this aspect, the system 100 may include a spectroscopic ellipsometer equipped with an illuminator 102 and a spectrometer 104. The illuminator 102 of the system 100 is configured to generate and direct illumination of a selected wavelength range (e.g., 150-2500 nm) to the structure disposed on the surface of the specimen 101. In turn, the spectrometer 104 is configured to receive illumination reflected from the surface of the specimen 101. It is further noted that the light emerging from the illuminator 102 is polarized using a polarization state generator 107 to produce a polarized illumination beam 106. The radiation reflected by the structure disposed on the specimen 101 is passed through a polarization state analyzer 109 and to the spectrometer 104. The radiation received by the spectrometer 104 in the collection beam 108 is analyzed with regard to polarization state, allowing for spectral analysis by the spectrometer of radiation passed by the analyzer. The one or more computing systems 130 are communicatively coupled to spectrometer 104. The measured spectra 111 are communicated to computing system 130 for analysis of the structure.

As depicted in FIG. 1, system 100 includes a single measurement technology (i.e., SE). However, in general, system 100 may include any number of different measurement technologies. By way of non-limiting example, system 100 may be configured as a spectroscopic ellipsometer (including Mueller matrix ellipsometry), a spectroscopic reflectometer, a spectroscopic scatterometer, an overlay scatterometer, an angular resolved beam profile reflectometer, a polarization resolved beam profile reflectometer, a beam profile reflectometer, a beam profile ellipsometer, any single or multiple wavelength ellipsometer, or any combination thereof. Furthermore, in general, measurement data collected by different measurement technologies and analyzed in accordance with the methods described herein may be collected from multiple tools, rather than one tool integrating multiple technologies.

Figure 2:
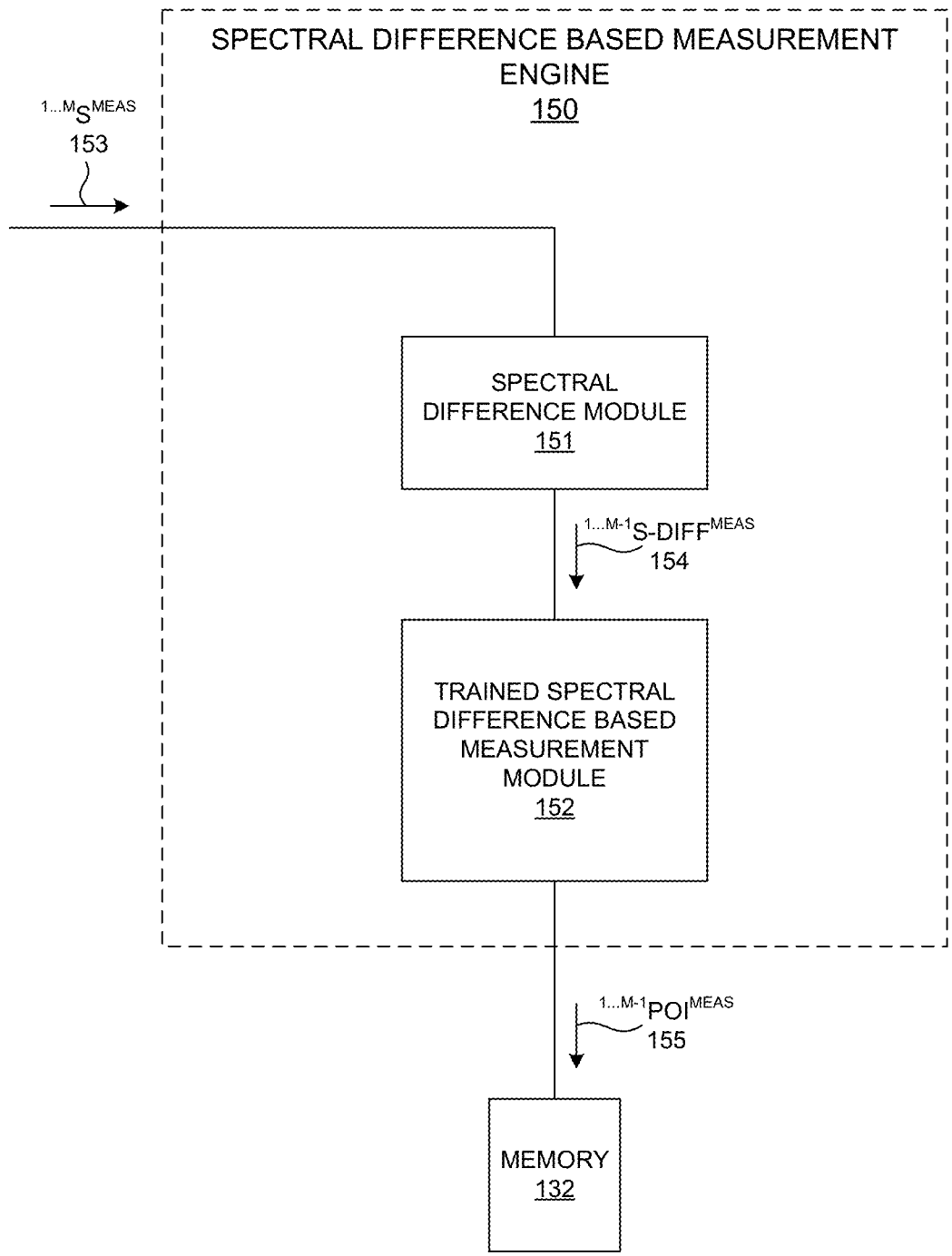
FIG. 2 is a diagram illustrative of a spectral difference based measurement model inference engine 150 in one embodiment.

In some embodiments, computing system 130 is configured as a spectral difference based measurement engine 150. As depicted in FIG. 2, spectral difference based measurement engine 150 includes a spectral difference module 151 and a trained spectral difference based measurement module 152. Measured spectra, $^{1\cdots M}S^{MEAS}$ 153, are collected from M different measurement points in a fabrication process flow by a measurement system, e.g., metrology system 100. Each different measurement point is separated from an adjacent measurement point by one or more fabrication process steps in a fabrication process flow.

Measured spectra include any suitable indication of the spectral response of the structure under measurement. By way of non-limiting example, measured spectral signals include traditional formulations such as harmonic signals, e.g., ($\Psi$, $\Delta$), ($\alpha$, $\beta$), etc., one or more Mueller Matrix elements, intensity profile, or any other suitable representation of the spectral response of a structure under measurement.

As depicted in FIG. 2, measured spectra, $^{1\cdots M}S^{MEAS}$ 153, are communicated to spectral difference module 151. Spectral difference module computes a measure indicative of spectral difference between any two measurement points based on the measured spectra at the two measurement points. In some examples, spectral difference module 151 computes a measure indicative of spectral differences between adjacent measurement points in a process flow.

Figure 3:
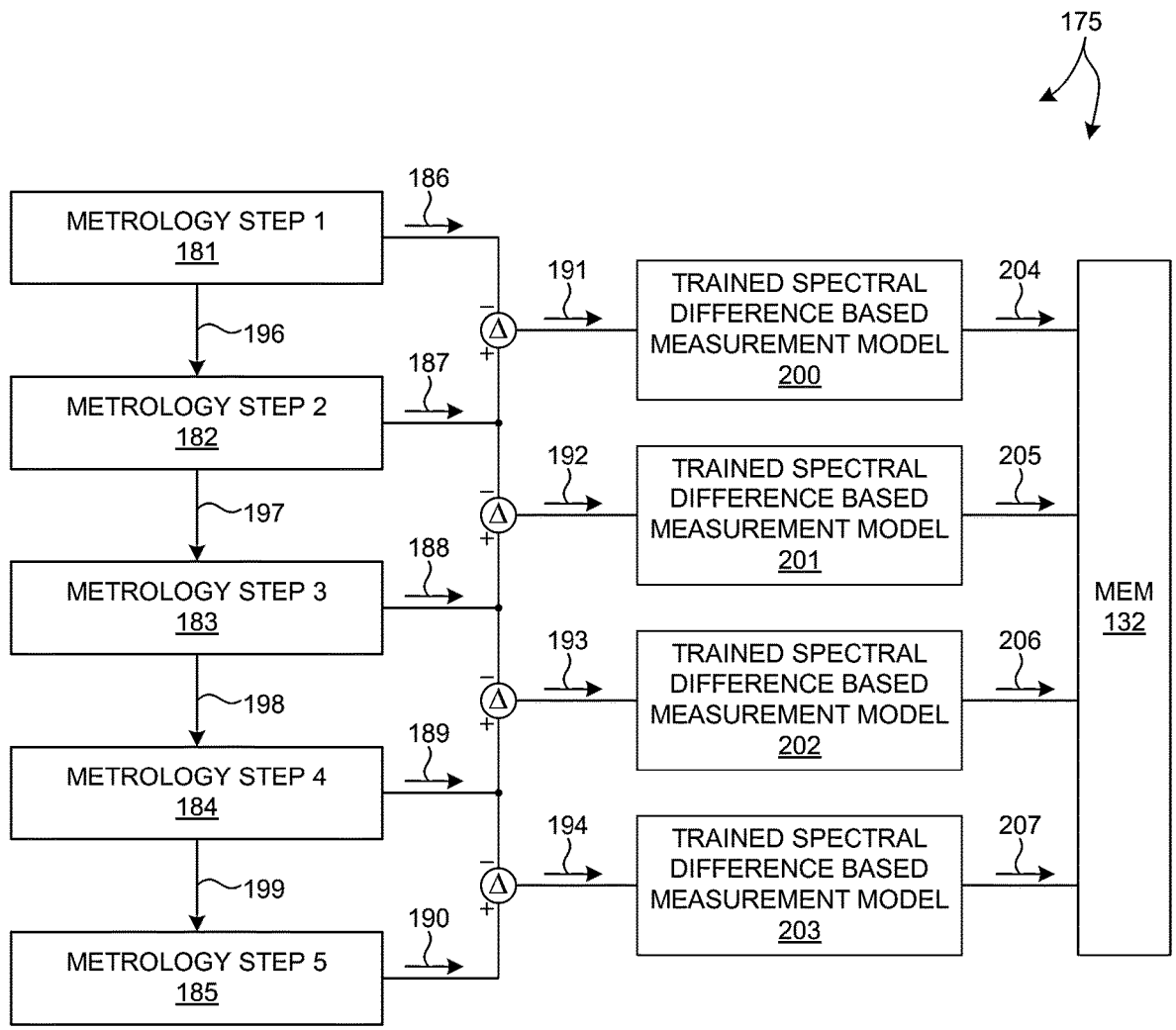
FIG. 3 is a diagram illustrative of a fabrication process flow 175 including a sequence of fabrication process steps and metrology steps in one embodiment.

FIG. 3 depicts a fabrication process flow 175 that includes a sequence of fabrication process steps including a lithography step 196, an etch step 197, another lithography step 198, and another etch step 199. Each process step physically transforms the structures under measurement. At each metrology step, metrology tool 100 is employed to measure the spectral response of metrology targets on the wafer in the current physical state and communicate the measured spectral signals to spectral difference module 151.

An incoming wafer in a particular physical state within the fabrication process is measured by a metrology tool, e.g., metrology tool 100, at metrology step 181 before lithography step 196, at metrology step 182 before etch step 197, at metrology step 183 before lithography step 198, at metrology step 184 before etch step 199, and at metrology step 185 after etch step 199.

A measure of spectral difference 191 is determined by spectral difference module 151 based on measured spectral signals 186 and 187 associated with metrology steps 181 and 182, respectively. A measure of spectral difference 192 is determined by spectral difference module 151 based on measured spectral signals 187 and 188 associated with metrology steps 182 and 183, respectively. A measure of spectral difference 193 is determined by spectral difference module 151 based on measured spectral signals 188 and 189 associated with metrology steps 183 and 184, respectively. A measure of spectral difference 194 is determined by spectral difference module 151 based on measured spectral signals 189 and 190 associated with metrology steps 184 and 185, respectively.

In some embodiments, spectral difference module 151 determines a measure of spectral difference by determining the difference in measured intensity at each of a discrete set of wavelengths. In these examples, the measure of spectral difference is a set of intensity difference values. In some embodiments, spectral difference module 151 determines a measure of spectral difference by determining the difference in measured values of harmonic signals, e.g., ($\Psi$, $\Delta$) values, ($\alpha$, $\beta$) values, etc., at each of a discrete set of wavelengths. In these examples, the measure of spectral difference is a set of harmonic difference values. In some embodiments, spectral difference module 151 determines a measure of spectral difference by determining the difference in measured values of one or more Mueller Matrix elements at each of a discrete set of wavelengths. In these examples, the measure of spectral difference is a set of Mueller Matrix difference values.

In some embodiments, spectral difference module 151 determines a measure of spectral difference by determining a scalar value indicative of the difference in measured values of spectral signals across all measured wavelengths. In some examples, a Root Mean Squared Error (RSME) measure of spectral signal differences across all measured wavelengths is employed. In general, any suitable scalar metric indicative of differences between sets of measurement signals is contemplated within the scope of this patent document.

In some embodiments, the measure of spectral difference is a set of coefficients characterizing a mathematical function fit to the spectral differences at each of a discrete set of wavelengths. In some embodiments, spectral difference module 151 fits a mathematical function, e.g., polynomial function, to the set of spectral differences determined at each of a discrete set of wavelengths. In these embodiments, the coefficients of the mathematical function are the measure of spectral difference between the two sets of measured spectral signals under consideration.

In some embodiments, the measure indicative of spectral difference is determined based on a weighting of spectral differences according to wavelength across a set of discrete wavelengths. In these embodiments, one or more spectral difference values are weighted differently than other spectral difference values across the set of discrete set of measured wavelengths. In this manner, the measure indicative of spectral difference, whether expressed as a set of difference values, a scalar value, or coefficients of a functional fit to difference values, is weighted based on wavelength. In some embodiments, shorter wavelengths are weighted more than longer wavelengths, or vice-versa.

As depicted in FIG. 2, the measures of spectral difference, $^{1\cdots M-1}$S-DIFF$^{MEAS}$ 154, between adjacent measurement points in a fabrication process flow are communicated to trained spectral difference based measurement module 152. A trained spectral difference based measurement model is employed to estimate values of one or more parameters of interest, $^{1\cdots M-1}$POI$^{MEAS}$ 155, including changes to one or more parameters of interest, due to the intervening process steps between adjacent measurement points based on the spectral differences. The values of the one or more parameters of interest are communicated to a memory, e.g., memory 132.

In some embodiments, the trained spectral difference based measurement model is trained to receive a measure of spectral difference between two specific measurement steps and generate estimated values of one or more parameters of interest based on the spectral difference. In these embodiments, different trained spectral difference based measurement models are employed to estimate values of one or more parameters of interest based on measures of spectral differences associated with different pairs of measurement steps.

By way of example, FIG. 3 depicts trained spectral difference based measurement models 200-203. Each spectral difference based measurement model is trained based on spectral differences associated with different pairs of measurement steps. Thus, each trained spectral difference based measurement model operates on measures of spectral difference associated with a specific pair of measurement steps in a fabrication process flow.

As depicted in FIG. 2, trained spectral difference based measurement model 200 receives the measured of spectral difference between measured spectral signals 186 and 187 associated with metrology steps 181 and 182, and generates values of one or more parameters of interest associated with the measured structures measured at metrology steps 181 and 182. Similarly, trained spectral difference based measurement model 201 receives the measured of spectral difference between measured spectral signals 187 and 188 associated with metrology steps 182 and 183, and generates values of one or more parameters of interest associated with the measured structures measured at metrology steps 182 and 183. Trained spectral difference based measurement model 202 receives the measured of spectral difference between measured spectral signals 188 and 189 associated with metrology steps 183 and 184, and generates values of one or more parameters of interest associated with the measured structures measured at metrology steps 183 and 184. Trained spectral difference based measurement model 203 receives the measured of spectral difference between measured spectral signals 189 and 190 associated with metrology steps 184 and 185, and generates values of one or more parameters of interest associated with the measured structures measured at metrology steps 184 and 185.

In some other embodiments, the trained spectral difference based measurement model is trained to receive multiple measures of spectral difference, each associated with a different pair of measurement steps, and estimate values of one or more parameters of interest based on each spectral difference. In these embodiments, a trained spectral difference based measurement model is employed to estimate values of one or more parameters of interest based on measures of spectral differences associated with different pairs of measurement steps.

Figure 4:
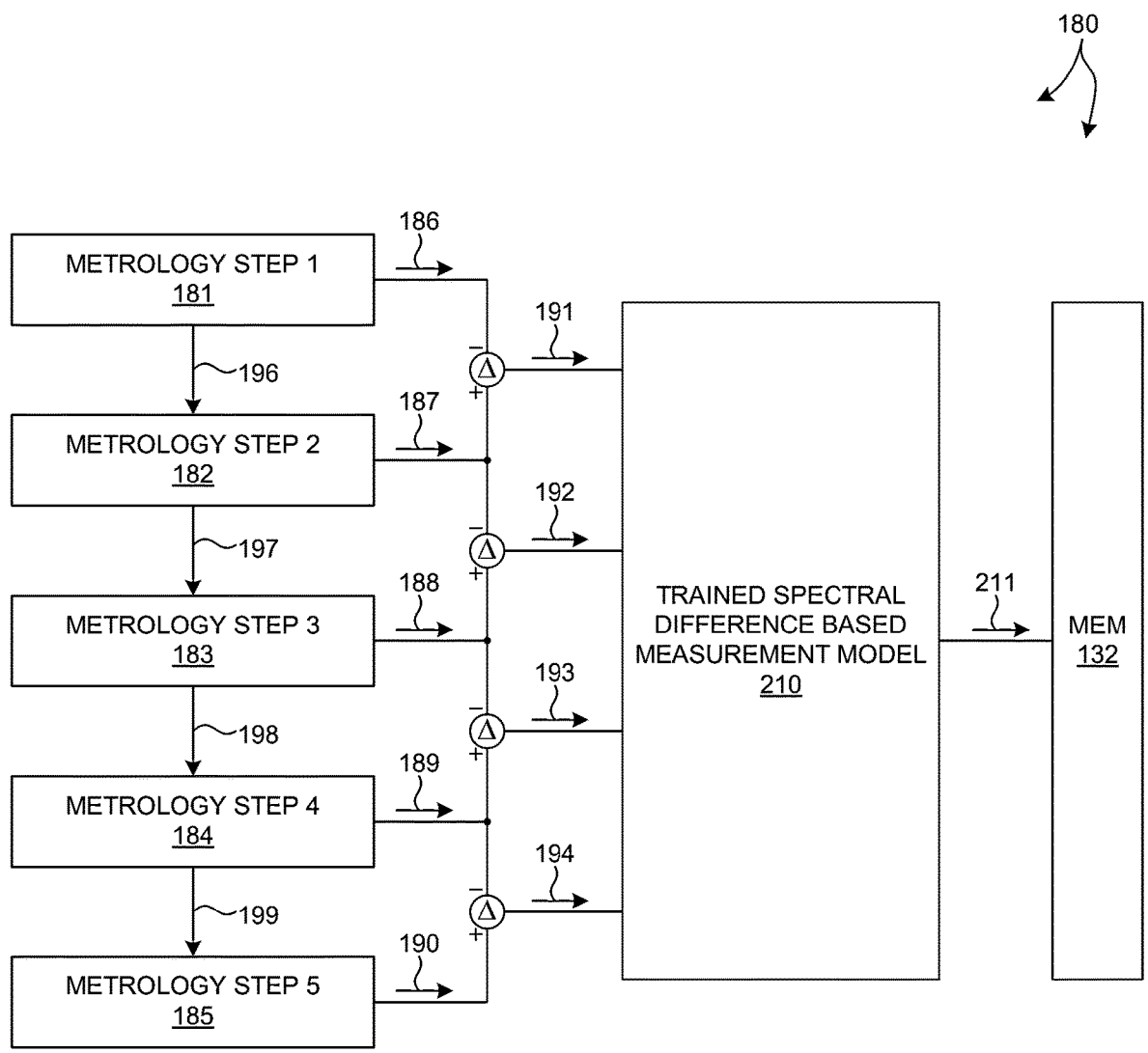
FIG. 4 is a diagram illustrative of a fabrication process flow 180 including a sequence of fabrication process steps and metrology steps in another embodiment.

FIG. 4 depicts a fabrication process flow 180 including the sequence of fabrication process steps depicted by FIG. 3 in another embodiment. Like numbered elements depicted in FIG. 4 and referenced in FIG. 3 are analogous. As depicted in FIG. 4, spectral difference based measurement model 210 is trained based on spectral differences associated with multiple, different pairs of measurement steps, i.e., metrology steps 186 and 187, metrology steps 187 and 188, metrology steps 188 and 189, and metrology steps 189 and 190. In the embodiment depicted in FIG. 4, measures of spectral difference 191-194 are provided as input to trained spectral difference based measurement model 210. In response, trained spectral difference based measurement model 210 estimates values of one or more parameters of interest 211 based on the measures of spectral difference associated with the different pairs of measurement steps in the fabrication process flow. The estimated values 211 are communicated to a memory, e.g., memory 132.

In some other embodiments, a trained spectral difference based measurement model is a machine learning based measurement model trained to estimate the values of structural parameters of interest from measures of spectral difference. Exemplary machine learning based models include a linear model, a polynomial model, a response surface model, a decision tree model, a random forest model, a support vector machine model, a neural network models, a deep learning model, a genetic algorithm based model, or other types of models.

In another aspect, a trained spectral difference based measurement model is employed to simulate changes in values of one or more parameters of interest, and the simulated changes are employed to adjust process control variables to improve process performance. In some embodiments, expected spectral difference data is simulated, e.g., using process and metrology simulators, or generated based on past use cases, user experience, etc. The expected spectral difference data is provided as input to a trained spectral difference based measurement model. The trained spectral difference based measurement model estimates expected values of one or more parameters of interest based on the expected spectral difference data. In this manner, the trained spectral difference based measurement model not only monitors the production of multilayer film stacks in-line, but also predicts production trends. In addition, one or more process variables, e.g., focus, dosage, etch time, etc., are adjusted based on the expected values of the parameters of interest. In this manner, the process is tuned to improve process performance.

In another aspect, a spectral difference based measurement model is trained based on Design Of Experiments (DOE) spectral signals associated with different measurement steps in a fabrication process flow.

In some examples, a spectral difference based measurement model is trained based on simulated measurement data or actual measurement data associated with the measurement of Design of Experiments (DOE) wafers. Machine learning, feature extraction, and other techniques are employed to train a direct input-output model (i.e., transfer function) that relates DOE spectral differences and corresponding reference measurements of the parameters of interest. In some embodiments, the training set of metrology targets includes targets that are nominally the same, i.e., the targets vary from one another because of process variations. In some embodiments, the process variations that impact the parameters of interest are intentionally amplified for purposes of model training.

In some examples, DOE spectral signals and corresponding values of parameters of interest associated with one or more process steps are generated synthetically, i.e., via simulation. For example, a process simulator such as the Positive Resist Optical Lithography (PROLITH) simulation software available from KLA-Tencor Corporation, Milpitas, California (USA) may be employed. In general, any process modeling technique or tool may be contemplated within the scope of this patent document (e.g., Coventor simulation software available from Coventor, Inc., Cary, North Carolina, USA).

In some examples, the DOE spectral signals include two ellipsometric parameters ($\Psi$, $\Delta$) over a spectral range obtained at different measurement sites. However, in general, the measurement data may be any measurement data indicative of the structural or geometric properties of the structures patterned onto the surface of a semiconductor wafer.

For purposes of model training, measurement data may be acquired from any location with known perturbations in the design parameters, e.g., structure or process parameters. These locations, for example, may be in the scribe line, on-device, or may be at other locations on the wafer where, for example, lithographic exposure conditions or reticle design characteristics vary over a range of values. In another example, measurement data may be acquired from different device locations (e.g., a location with dense features and a location with isolated features, or locations with two different CDs on mask). In general, the measurement data is acquired from different locations that are perturbed in a known way. The perturbation may be known from mask data, Equipment Data Acquisition (EDA) data, process data, etc.

A value of the parameter(s) of interest is known at each of the plurality of measurement sites.

In some examples, a preferred embodiment, the set of systematic variations is implemented in the fabrication of an actual DOE wafer. The DOE wafer is subsequently measured to generate the raw measurement data. A manufactured wafer includes systematic errors which cannot be easily modeled by simulation. For example, the effect of underlayers is more accurately captured by measurements of a real wafer. The underlayer contribution can be decorrelated from the measurement responses by modifying process parameters during manufacture, e.g., focus and exposure variations, for a fixed underlayer condition. In another example, the underlayer contribution can be mitigated by taking multiple data sets from features with varying top layer topography and constant underlayer conditions. In one example, the top layer may include a periodic structure and the underlayer may be non-periodic.

Measurement locations may be selected to increase measurement sensitivity. In one example, measurements performed at line ends are most sensitive to changes in focus. In general, measurements should be taken at structures that are most sensitive to changes in the parameter to be measured.

In some other examples, DOE spectral signals and corresponding values of parameters of interest associated with one or more process steps are measured from actual DOE wafers. The DOE spectral measurement data includes actual spectral measurements at multiple measurement steps in the fabrication process flow. Corresponding DOE values of the parameter(s) of interest characterizing the metrology targets are measured by a reference measurement system. A reference metrology system is a trusted metrology system such as a Scanning Electron Microscope (SEM), Tunneling electron Microscope (TEM), Atomic Force Microscope (AFM), or an x-ray measurement system such as a Small-Angle X-Ray Scatterometer (SAXS) or an X-Ray Fluorescence (XRF) system that is able to accurately measure the parameter value. However, typically, the reference metrology system generally lacks the capability to operate as an inline metrology system, for example, due to low throughput, high measurement uncertainty for the measurement of individual sites, etc.).

In some embodiments, process variations and corresponding parameter variations are organized in a Design of Experiments (DOE) pattern on the surface of a semiconductor wafer (e.g., DOE wafer). In this manner, the measurement system interrogates different locations on the wafer surface that correspond with different process and corresponding structural parameter values.

In general, measurement data associated with any known variation of process parameters (e.g., lithography focus, exposure, and other local or global parameters), structural parameter, or both, may be contemplated.

In some examples, one or more features of the spectral measurement data are extracted by reducing a dimension of the measurement data. Although, this reduction is optional, when it is employed, the spectral difference based measurement model is trained based at least in part on the one or more extracted features.

In general, the dimension of the measurement data, may be reduced by a number of known methods, including a principal components analysis, a non-linear principal components analysis, a selection of individual signals from the second amount of measurement data, and a filtering of the second amount of measurement data.

In some examples, the measurement data is analyzed using Principal Components Analysis (PCA), non-linear PCA, kernel PCA, Independent Component Analysis (ICA), Fast Fourier Transform analysis (FFT), Discrete Cosine Transform analysis (DCT), or a combination of these techniques to extract features that most strongly reflect the variations in structural parameters that are present at the different measurement sites. In some other examples, a signal filtering technique may be applied to extract signal data that most strongly reflects the parameter variations present at the different measurement sites. In some other examples, individual signals that most strongly reflect the parameter variations present at the different measurement sites may be selected from multiple signals present in the measurement data. Although, it is preferred to extract features from the measurement data and process information to reduce the dimension of data subject to subsequent analysis, it is not strictly necessary.

Figure 5:
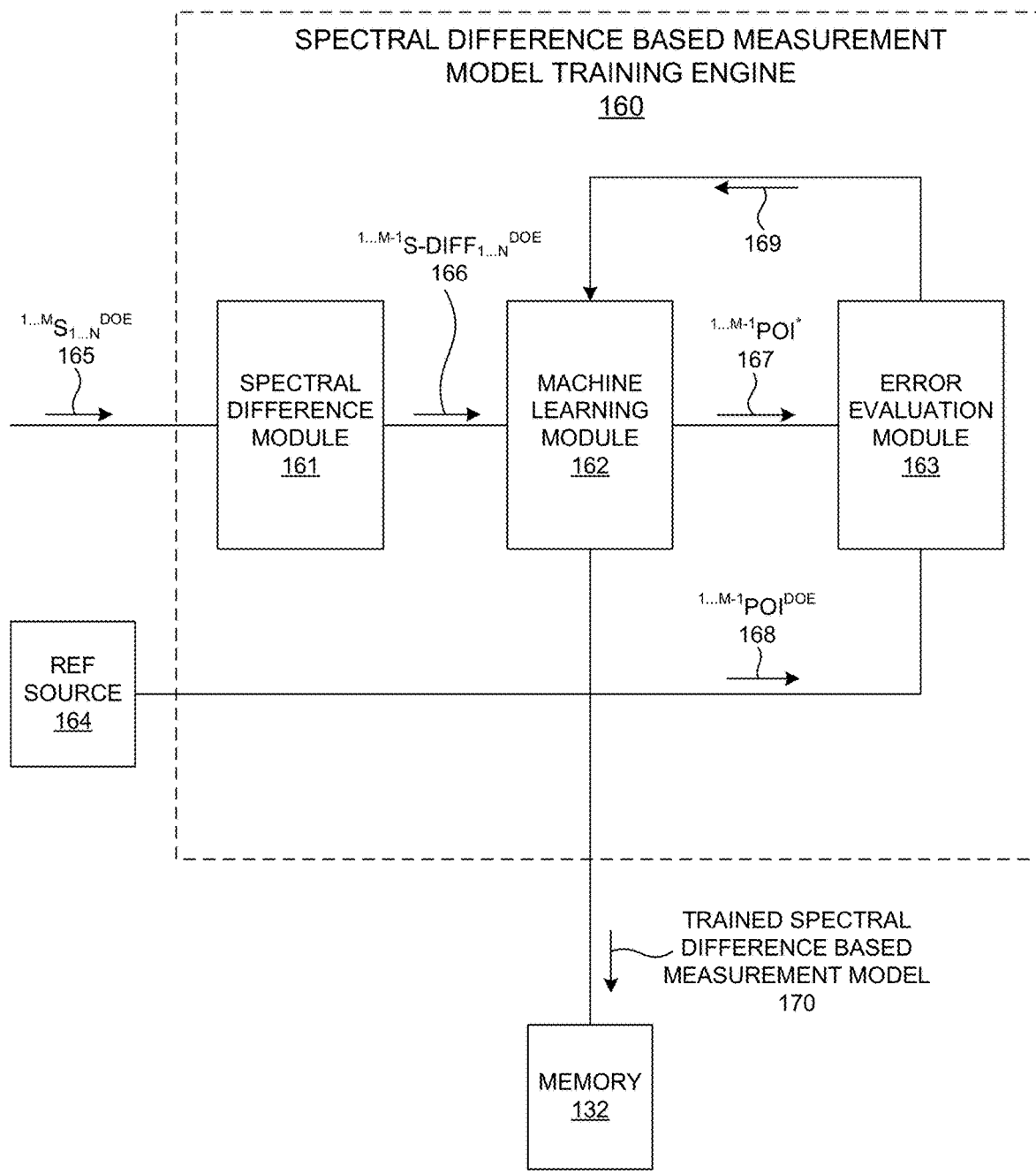
FIG. 5 is a diagram illustrative of a spectral difference based measurement model training engine 160 in one embodiment.

FIG. 5 is a diagram illustrative of a spectral difference based measurement model training engine 160 in one embodiment. In some embodiments, computing system 130 is configured as a spectral difference based measurement model training engine 160 as described herein. As depicted in FIG. 5, spectral difference based measurement model training engine 160 includes spectral difference module 161, machine learning module 162, and error evaluation module 163.

A training dataset, $^{1\cdots M}S_{1\ldots N}^{DOE}$ 165, including DOE spectra from M different metrology points in a fabrication process flow at N sample wafer locations are communicated to spectral difference module 161. Each different measurement point is separated from an adjacent measurement point by one or more fabrication process steps in a fabrication process flow.

In the example depicted in FIG. 5, spectral difference module 161 computes a measure indicative of spectral difference, $^{1\cdots M-1}S\text{-DIFF}_{1\ldots N}^{DOE}$ 166, between adjacent measurement points in a process flow. Thus, DOE measurement data at M different metrology points in a fabrication process flow results in M−1 measures of spectral difference associated with each of the N sample locations.

The DOE measures indicative of spectral difference, $^{1\cdots M}S\text{-DIFF}_{1\ldots N}^{DOE}$ 166, are provided as input to machine learning module 162. In some examples, the spectral difference based measurement model is a neural network model. As depicted in FIG. 5, machine learning module 162 evaluates a neural network model for data sets $^{1\cdots M-1}S\text{-DIFF}_{1\ldots N}^{DOE}$ 166. The output of the neural network model is the estimated values, $^{1\cdots M-1}POI^*$ 167, of each of the parameters of interest associated with each pair of measurement points in the process flow. The estimated values, $^{1\cdots M-1}POI^*$ 167, are communicated to error evaluation module 208. Error evaluation module 208 compares the estimated values of the parameters of interest, $^{1\cdots M-1}POI^*$ 167, determined by the neural network model with the corresponding trusted values of the parameters of interest, $^{1\cdots M-1}POI^{DOE}$ 168. Error evaluation module 208 updates the neural network weighting values 169 to minimize a function characterizing a difference between determined and trusted values of the parameters of interest (e.g., quadratic error function, linear error function, or any other suitable difference function). The updated neural network weighting values 169 are communicated to machine learning module 162. Machine learning module 162 updates the neural network model with the updated neural network weighting values for the next iteration of the training process. The iteration continues until the function characterizing a difference between determined and known values of the parameters of interest is minimized. The resulting trained spectral difference based measurement model 170 is communicated to memory (e.g., memory 132).

As depicted in FIG. 5, spectral difference based measurement model training engine 160 receives values of the parameters of interest, $^{1\cdots M-1}POI^{DOE}$ 168, from a reference source 164. Reference source 164 is a trusted metrology system, a simulator, or both, employed to generate a DOE set of DOE parameter values as described hereinbefore.

Figure 6:
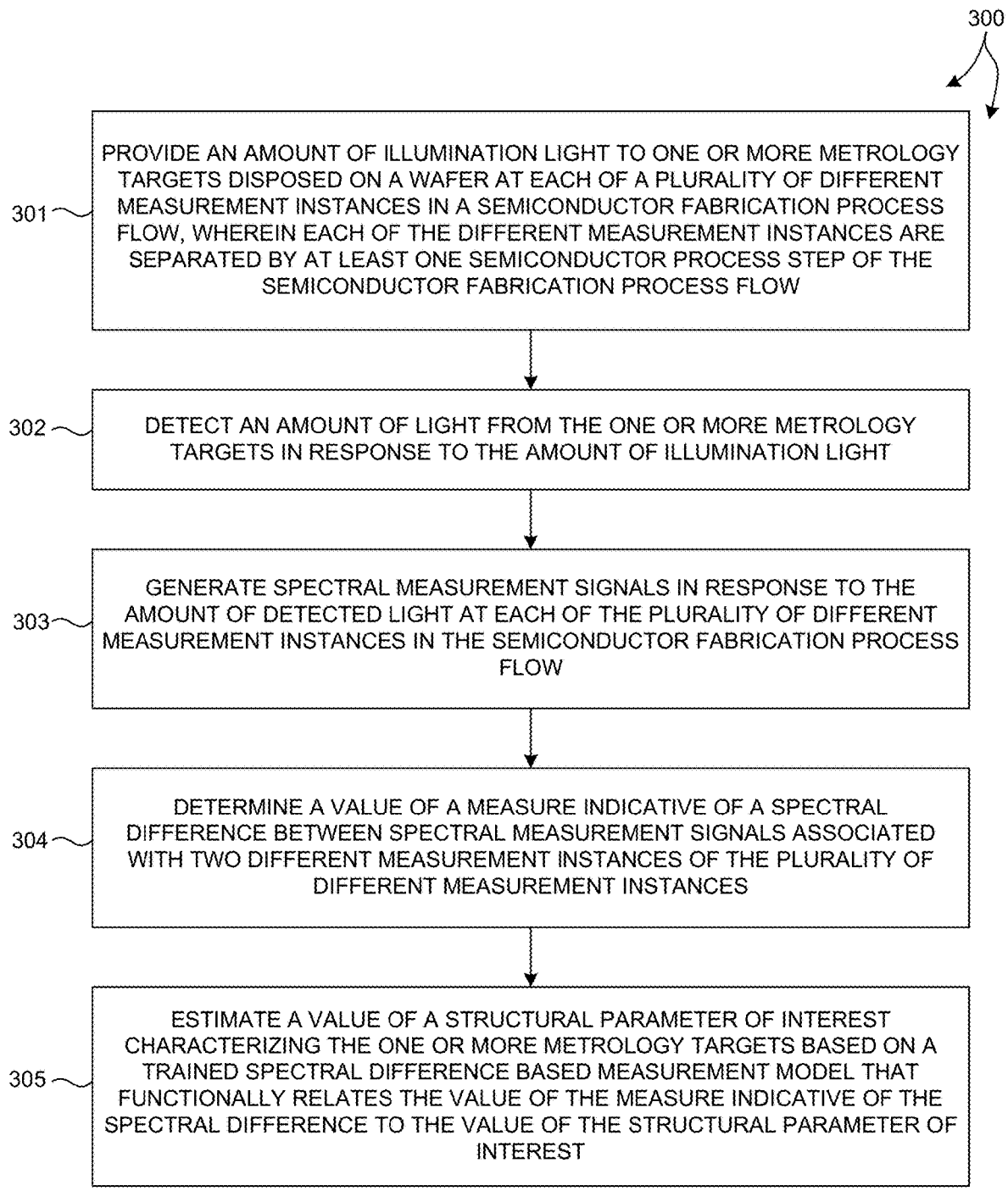
FIG. 6 is a flowchart illustrative of a method 300 of determining one or more parameter values characterizing a structure under measurement based on measured spectral differences in one example.

FIG. 6 illustrates a method 300 suitable for implementation by a metrology system such as metrology system 100 illustrated in FIG. 1 of the present invention. In one aspect, it is recognized that data processing blocks of method 300 may be carried out via a pre-programmed algorithm executed by one or more processors of computing system 130, or any other general purpose computing system. It is recognized herein that the particular structural aspects of metrology system 100 do not represent limitations and should be interpreted as illustrative only.

In block 301, an amount of illumination light is provided to one or more metrology targets disposed on a wafer at each of a plurality of different measurement instances in a semiconductor fabrication process flow. Each of the different measurement instances are separated by at least one semiconductor process step of the semiconductor fabrication process flow.

In block 302, an amount of light from the one or more metrology targets is detected in response to the amount of illumination light.

In block 303, spectral measurement signals are generated in response to the amount of detected light at each of the plurality of different measurement instances in the semiconductor fabrication process flow.

In block 304, a value of a measure indicative of a spectral difference between spectral measurement signals associated with two different measurement instances of the plurality of different measurement instances is determined.

In block 305, a value of a structural parameter of interest characterizing the one or more metrology targets is estimated based on a trained spectral difference based measurement model that functionally relates the value of the measure indicative of the spectral difference to the value of the structural parameter of interest.

In some examples, the use of measurement data associated with multiple targets for model building, training, and measurement eliminates, or significantly reduces, the effect of under layers in the measurement result. In one example, measurement signals from two targets are subtracted to eliminate, or significantly reduce, the effect of under layers in each measurement result. The use of measurement data associated with multiple targets increases the sample and process information embedded in the model. In particular, the use of training data that includes measurements of multiple, different targets at one or more measurement sites enables more accurate measurements.

In one example, a measurement model is created from spectral measurements of a DOE wafer for both isolated and dense targets. The measurement model is then trained based on the spectral measurement data and known structural parameter values. The resulting trained measurement models are subsequently employed to calculate structural parameter values for both isolated and dense targets on sample wafers. In this manner, each parameter has its own trained model that calculates the parameter value from the measured spectra (or extracted features) associated with both isolated and dense targets.

In another further aspect, measurement data derived from measurements performed by a combination of multiple, different measurement techniques is collected for model building, training, and measurement. The use of measurement data associated with multiple, different measurement techniques increases the sample and process information embedded in the model and enables more accurate measurements. Measurement data may be derived from measurements performed by any combination of multiple, different measurement techniques. In this manner, different measurement sites may be measured by multiple, different measurement techniques to enhance the measurement information available for characterization of the semiconductor structures.

In general, any measurement technique, or combination of two or more measurement techniques may be contemplated within the scope of this patent document. Exemplary measurement techniques include, but are not limited to spectroscopic ellipsometry, including Mueller matrix ellipsometry, spectroscopic reflectometry, spectroscopic scatterometry, scatterometry overlay, beam profile reflectometry, both angle-resolved and polarization-resolved, beam profile ellipsometry, single or multiple discrete wavelength ellipsometry, transmission small angle x-ray scatterometer (TSAXS), small angle x-ray scattering (SAXS), grazing incidence small angle x-ray scattering (GISAXS), wide angle x-ray scattering (WAXS), x-ray reflectivity (XRR), x-ray diffraction (XRD), grazing incidence x-ray diffraction (GIXRD), high resolution x-ray diffraction (HRXRD), x-ray photoelectron spectroscopy (XPS), x-ray fluorescence (XRF), grazing incidence x-ray fluorescence (GIXRF), low-energy electron induced x-ray emission scatterometry (LEXES), x-ray tomography, and x-ray ellipsometry. In general, any metrology technique applicable to the characterization of semiconductor structures, including image based metrology techniques, may be contemplated. Additional sensor options include electrical sensors such as non-contact capacitance/voltage or current/voltage sensors which bias the device and detect the resulting bias with an optical sensor (or the converse), or assisted optical techniques, such as XRD, XRF, XPS, LEXES, SAXS, and pump probe techniques. In one embodiment a two-dimensional beam profile reflectometer (pupil imager) may be used to collect both angle resolved and/or multi-spectral data in a small spot size. A UV Linnik interferometer may also be used as a Mueller matrix spectral pupil imager.

In another example, the methods and systems described herein may be applied to overlay metrology. Grating measurements are particularly relevant to the measurement of overlay. The objective of overlay metrology is to determine shifts between different lithographic exposure steps. Performing overlay metrology on-device is difficult due to the small size of on-device structures, and the typically small overlay value.

For example, the pitch of typical scribe line overlay metrology structures varies from 200 nanometers to 2,000 nanometers. But, the pitch of on-device, overlay metrology structures is typically 100 nanometers or less. In addition, in a nominal production environment, the device overlay is only a small fraction of the periodicity of the device structure. In contrast, proxy metrology structures used in scatterometry overlay are frequently offset at larger values, e.g., quarter of the pitch, to enhance signal sensitivity to overlay.

Under these conditions, overlay metrology is performed with sensor architectures having sufficient sensitivity to small offset, small pitch overlay. The methods and systems described herein may be employed to obtain a measurement signal sensitive to overlay based on on-device structures, proxy structures, or both.

After acquisition, the measured signals are analyzed to determine overlay error based on variations in the measured signals. In one further aspect, the spectral or angle-resolved data is analyzed using PCA, and an overlay model is trained to determine overlay based on the principal components detected in the measured signal. In one example, the overlay model is a neural network model. In this sense, the overlay model is not a parametric model, and thus is not prone to errors introduced by inaccurate modeling assumptions.

In some embodiments, the training of the overlay metrology model is based on measurements of dedicated metrology structures which are nominally identical to the device features but with larger offsets. This can help to overcome the sensitivity problem. These offsets can be introduced by fixed design offsets introduced between features in the two layers to be measured during reticle design. The offsets can also be introduced by shifts in the lithography exposure. The overlay error may be extracted more efficiently from the compressed signal (e.g., PCA signal) by using multiple, shifted targets (e.g., pitch/4 and −pitch/4) and the effect of the underlayer may also be reduced.

It should be recognized that the various steps described throughout the present disclosure may be carried out by a single computer system 130 or, alternatively, a multiple computer system 130. Moreover, different subsystems of the system 100, such as the spectroscopic ellipsometer 104, may include a computer system suitable for carrying out at least a portion of the steps described herein. Therefore, the aforementioned description should not be interpreted as a limitation on the present invention but merely an illustration. Further, the one or more computing systems 130 may be configured to perform any other step (s) of any of the method embodiments described herein.

In addition, the computer system 130 may be communicatively coupled to the spectrometer 104 in any manner known in the art. For example, the one or more computing systems 130 may be coupled to computing systems associated with the spectrometer 104. In another example, the spectrometer 104 may be controlled directly by a single computer system coupled to computer system 130.

The computer system 130 of the metrology system 100 may be configured to receive and/or acquire data or information from the subsystems of the system (e.g., spectrometer 104 and the like) or the one or more process tools 120 by a transmission medium that may include wireline and/or wireless portions. In this manner, the transmission medium may serve as a data link between the computer system 130 and other systems or subsystems of the system 100.

Computer system 130 of the metrology system 100 may be configured to receive and/or acquire data or information (e.g., measurement results, modeling inputs, modeling results, etc.) from other systems by a transmission medium that may include wireline and/or wireless portions. In this manner, the transmission medium may serve as a data link between the computer system 130 and other systems (e.g., memory on-board metrology system 100, external memory, a reference measurement source, or other external systems). For example, the computing system 130 may be configured to receive measurement data from a storage medium (i.e., memory 132 or an external memory) via a data link. For instance, spectral results obtained using spectrometer 104 may be stored in a permanent or semi-permanent memory device (e.g., memory 132 or an external memory). In this regard, the spectral results may be imported from on-board memory or from an external memory system. Moreover, the computer system 130 may send data to other systems via a transmission medium. For instance, a measurement model or a structural parameter value 140 determined by computer system 130 may be communicated and stored in an external memory. In this regard, measurement results may be exported to another system.

Computing system 130 may include, but is not limited to, a personal computer system, mainframe computer system, workstation, image computer, parallel processor, or any other device known in the art. In general, the term "computing system" may be broadly defined to encompass any device having one or more processors, which execute instructions from a memory medium.

Program instructions 134 implementing methods such as those described herein may be transmitted over a transmission medium such as a wire, cable, or wireless transmission link. For example, as illustrated in FIG. 1, program instructions 134 stored in memory 132 are transmitted to processor 131 over bus 133. Program instructions 134 are stored in a computer readable medium (e.g., memory 132). Exemplary computer-readable media include read-only memory, a random access memory, a magnetic or optical disk, or a magnetic tape.

In some embodiments, the illumination light and light collected from the illuminated measurement site includes multiple, different wavelengths. In some embodiments, the light is collected from the illuminated measurement site at multiple, different collection angles. By detecting light at multiple wavelengths and angles of collection, measurement sensitivity to critical dimensions (e.g., CD) is improved. In some embodiments, the light is collected from the illuminated measurement site at multiple, different azimuthal angles. These out-of-plane measurements may also improve measurement sensitivity to critical dimensions. In some embodiments, the collection of optical measurement data is optimized for a particular set of system settings, e.g., spectroscopic or angular resolved system, one or more azimuth angles one or more wavelengths, and any combination thereof.

In some examples, the model building, training, and measurement methods described herein are implemented as an element of a SpectraShape® optical critical-dimension metrology system available from KLA-Tencor Corporation, Milpitas, California, USA. In this manner, the model is created and ready for use immediately after the DOE wafer spectra are collected by the system.

In some other examples, the model building and training methods described herein are implemented off-line, for example, by a computing system implementing AcuShape® software available from KLA-Tencor Corporation, Milpitas, California, USA. The resulting, trained model may be incorporated as an element of an AcuShape® library that is accessible by a metrology system performing measurements.

In general, the methods and systems for performing semiconductor metrology presented herein may be applied directly to actual device structures or to dedicated metrology targets (e.g., proxy structures) located in-die or within scribe lines.

In yet another aspect, the measurement techniques described herein can be used to provide active feedback to a process tool (e.g., lithography tool, etch tool, deposition tool, etc.). For example, values of the structural parameters determined using the methods described herein can be communicated to a lithography tool to adjust the lithography system to achieve a desired output. In a similar way etch parameters (e.g., etch time, diffusivity, etc.) or deposition parameters (e.g., time, concentration, etc.) may be included in a measurement model to provide active feedback to etch tools or deposition tools, respectively.

In general, the systems and methods described herein can be implemented as part of a dedicated metrology tool, or alternatively implemented as part of a process tool (e.g., lithography tool, etch tool, etc.).

As described herein, the term "critical dimension" includes any critical dimension of a structure (e.g., bottom critical dimension, middle critical dimension, top critical dimension, sidewall angle, grating height, etc.), a critical dimension between any two or more structures (e.g., distance between two structures), and a displacement between two or more structures (e.g., overlay displacement between overlaying grating structures, etc.). Structures may include three dimensional structures, patterned structures, overlay structures, etc.

As described herein, the term "critical dimension application" or "critical dimension measurement application" includes any critical dimension measurement.

As described herein, the term "metrology system" includes any system employed at least in part to characterize a specimen in any aspect, including measurement applications such as critical dimension metrology, overlay metrology, focus/dosage metrology, and composition metrology. However, such terms of art do not limit the scope of the term "metrology system" as described herein. In addition, the metrology system 400 may be configured for measurement of patterned wafers and/or unpatterned wafers. The metrology system may be configured as a LED inspection tool, edge inspection tool, backside inspection tool, macro-inspection tool, or multi-mode inspection tool (involving data from one or more platforms simultaneously), and any other metrology or inspection tool that benefits from the calibration of system parameters based on critical dimension data.

Various embodiments are described herein for a semiconductor processing system (e.g., an inspection system or a lithography system) that may be used for processing a specimen. The term "specimen" is used herein to refer to a wafer, a reticle, or any other sample that may be processed (e.g., printed or inspected for defects) by means known in the art.

As used herein, the term "wafer" generally refers to substrates formed of a semiconductor or non-semiconductor material. Examples include, but are not limited to, monocrystalline silicon, gallium arsenide, and indium phosphide. Such substrates may be commonly found and/or processed in semiconductor fabrication facilities. In some cases, a wafer may include only the substrate (i.e., bare wafer). Alternatively, a wafer may include one or more layers of different materials formed upon a substrate. One or more layers formed on a wafer may be "patterned" or "unpatterned." For example, a wafer may include a plurality of dies having repeatable pattern features.

A "reticle" may be a reticle at any stage of a reticle fabrication process, or a completed reticle that may or may not be released for use in a semiconductor fabrication facility. A reticle, or a "mask," is generally defined as a substantially transparent substrate having substantially opaque regions formed thereon and configured in a pattern. The substrate may include, for example, a glass material such as amorphous $SiO_2$. A reticle may be disposed above a resist-covered wafer during an exposure step of a lithography process such that the pattern on the reticle may be transferred to the resist.

One or more layers formed on a wafer may be patterned or unpatterned. For example, a wafer may include a plurality of dies, each having repeatable pattern features. Formation and processing of such layers of material may ultimately result in completed devices. Many different types of devices may be formed on a wafer, and the term wafer as used herein is intended to encompass a wafer on which any type of device known in the art is being fabricated.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A metrology system comprising:
a spectroscopic measurement subsystem comprising:
an illuminator configured to provide an amount of illumination light to one or more metrology targets disposed on a wafer at each of a plurality of different measurement instances in a semiconductor fabrication process flow, wherein each of the different measurement instances are separated by at least one semiconductor process step of the semiconductor fabrication process flow; and
a detector configured to detect an amount of light from the one or more metrology targets in response to the amount of illumination light and generate spectral measurement signals in response to the amount of detected light at each of the plurality of different measurement instances in the semiconductor fabrication process flow; and
a computing system configured to:
receive the spectral measurement signals associated with each of the plurality of different measurement instances;
determine a value of a measure indicative of a spectral difference between spectral measurement signals associated with two different measurement instances of the plurality of different measurement instances; and
estimate a value of a structural parameter of interest characterizing the one or more metrology targets based on a trained spectral difference based measurement model that functionally relates the value of the measure indicative of the spectral difference to the value of the structural parameter of interest.

2. The metrology system of claim 1, wherein the measure indicative of the spectral difference is a difference in measured intensity at each of a discrete set of measured wavelengths.

3. The metrology system of claim 1, wherein the measure indicative of the spectral difference is a difference in measured harmonic signal values at each of a discrete set of measured wavelengths.

4. The metrology system of claim 1, wherein the measure indicative of the spectral difference is a difference in measured values of one or more Mueller Matrix elements at each of a discrete set of measured wavelengths.

5. The metrology system of claim 1, wherein the measure indicative of the spectral difference is a scalar value indicative of a difference in measured values of the spectral measurement signals at each of a discrete set of measured wavelengths.

6. The metrology system of claim 5, wherein the scalar value is a Root Mean Squared Error (RMSE) measure of the difference in measured values of the spectral measurement signals at each of the discrete set of measured wavelengths.

7. The metrology system of claim 1, wherein the measure indicative of the spectral difference is a set of coefficients characterizing a mathematical function fit to the spectral difference at each of a discrete set of wavelengths.

8. The metrology system of claim 1, wherein the measure indicative of spectral difference is determined based on a weighting of the spectral difference between spectral measurement signals according to wavelength across a set of discrete wavelengths.

9. The metrology system of claim 1, wherein the two different measurement instances of the plurality of different measurement instances are adjacent measurement instances in the semiconductor fabrication process flow.

10. The metrology system of claim 1, the computing system further configured to:
train the spectral difference based measurement model with simulated measurement data, actual measurement data associated with a Design of Experiments (DOE) wafer, or a combination thereof.

11. The metrology system of claim 1, wherein the illuminator and detector comprise any of a spectroscopic ellipsometer, a spectroscopic reflectometer, a spectroscopic scatterometer, a beam profile reflectometer, and a beam profile ellipsometer.

12. A method comprising:
providing an amount of illumination light to one or more metrology targets disposed on a wafer at each of a plurality of different measurement instances in a semiconductor fabrication process flow, wherein each of the different measurement instances are separated by at least one semiconductor process step of the semiconductor fabrication process flow;

detecting an amount of light from the one or more metrology targets in response to the amount of illumination light;

generating spectral measurement signals in response to the amount of detected light at each of the plurality of different measurement instances in the semiconductor fabrication process flow;

determining a value of a measure indicative of a spectral difference between spectral measurement signals associated with two different measurement instances of the plurality of different measurement instances; and estimating a value of a structural parameter of interest characterizing the one or more metrology targets based on a trained spectral difference based measurement model that functionally relates the value of the measure indicative of the spectral difference to the value of the structural parameter of interest.

13. The method of claim 12, wherein the measure indicative of the spectral difference is a difference in measured intensity at each of a discrete set of measured wavelengths, a difference in measured harmonic signal values at each of a discrete set of measured wavelengths, or a difference in measured values of one or more Mueller Matrix elements at each of a discrete set of measured wavelengths.

14. The method of claim 12, wherein the measure indicative of the spectral difference is a scalar value indicative of a difference in measured values of the spectral measurement signals at each of a discrete set of measured wavelengths.

15. The method of claim 12, wherein the measure indicative of the spectral difference is a set of coefficients characterizing a mathematical function fit to the spectral difference at each of a discrete set of wavelengths.

16. The method of claim 12, wherein the measure indicative of spectral difference is determined based on a weighting of the spectral difference between spectral measurement signals according to wavelength across a set of discrete wavelengths.

17. The method of claim 12, wherein the two different measurement instances of the plurality of different measurement instances are adjacent measurement instances in the semiconductor fabrication process flow.

18. The method of claim 12, further comprising:
training the spectral difference based measurement model with simulated measurement data, actual measurement data associated with a Design of Experiments (DOE) wafer, or a combination thereof.

19. A metrology system comprising:
a spectroscopic measurement subsystem comprising:
an illuminator configured to provide an amount of illumination light to one or more metrology targets disposed on a wafer at each of a plurality of different measurement instances in a semiconductor fabrication process flow, wherein each of the different measurement instances are separated by at least one semiconductor process step of the semiconductor fabrication process flow; and a detector configured to detect an amount of light from the one or more metrology targets in response to the amount of illumination light and generate spectral measurement signals in response to the amount of detected light at each of the plurality of different measurement instances in the semiconductor fabrication process flow; and a non-transient, computer-readable medium storing instructions that, when executed by one or more processors, causes the one or more processors to:
receive the spectral measurement signals associated with each of the plurality of different measurement instances;

determine a value of a measure indicative of a spectral difference between spectral measurement signals associated with two different measurement instances of the plurality of different measurement instances; and estimate a value of a structural parameter of interest characterizing the one or more metrology targets based on a trained spectral difference based measurement model that functionally relates the value of the measure indicative of the spectral difference to the value of the structural parameter of interest.

20. The metrology system of claim 19, wherein the two different measurement instances of the plurality of different measurement instances are adjacent measurement instances in the semiconductor fabrication process flow.

* * * * *